United States Patent Office 3,245,796
Patented Apr. 12, 1966

3,245,796
PHOTOPOLYMERIZABLE ELEMENTS AND PROCESSES

Marion Burg, Metuchen, N.J., assignor to E. I. du Pont de Nemours and Company, Wilmington, Del., a corporation of Delaware
No Drawing. Filed Jan. 24, 1963, Ser. No. 253,760
12 Claims. (Cl. 96—67)

This invention relates to new photopolymerizable elements.

Various photopolymerizable elements for image formation are known. A number of quite diverse processes for producing copies of an image by thermal transfer also are known. In some of the commercially promising prior art processes, the image transfer is preceded by a wet development step (Abbott et al. U.S.P. 3,012,885), is accomplished in a wet system, or water-yielding materials are present in addition to light-sensitive materials. A practical dry process for thermally transferring images is taught in assignee's Belgian Patent 593,834 and corresponding U.S. Patent No. 3,060,023 [Burg and Cohen] patented October 23, 1962. In the latter process, underexposed (unexposed) photopolymerizable image areas of an exposed element are transferred thermally by selective adhesion of said areas to the surface of a receptor sheet.

It is an object of this invention to provide new, commercially useful photopolymerizable elements. Another object is to provide such elements that give colored images of good density and quality. A further object is to provide such elements which can be readily made and which utilize commercially available constituents. Still further objects will be apparent from the following description of the invention.

The photopolymerizable elements of this invention comprise a support, e.g., sheet or plate, bearing a solid layer comprising:

(a) At least one ethylenically unsaturated compound containing at least one (e.g., 1 to 5 or more) terminal ethylenic group ($CH_2{=}C<$), having a boiling point above 100° C. at normal pressure and being capable of forming an insoluble or high polymer by photoinitiated addition polymerization; and (b) A sublimable dye, e.g., one that sublimes at a temperature between 50° C. and 300° C. and below the temperature at which said layer becomes tacky and adherent to paper sufficient to give the desired density, usually in an amount of at least 0.001 part by weight.

Optionally, the solid layer may also contain (c) At least one viscosity-modifying agent, e.g., a nonthermoplastic or high-melting thermoplastic polymeric binder which does not become tacky and adherent to paper below the sublimation temperature of the dye. This component may contain at least one terminal ethylenic group or may be polymeric and contain a plurality of such groups or may be saturated. Components (a) and (c) when different can be present in amounts from 3 to 97 and 97 to 3 parts by weight and/or (d) An addition polymerization initiator activatable by actinic light and thermally inactive below 185° C., in an amount from 0.001 to 10 parts by weight, and, if desired, may contain (e) An addition polymerization inhibitor in an amount from 0.001 to 2.0 parts by weight, and (f) A chain transfer agent including one or more of the chain transfer agents disclosed in Barney et al. Canadian Patent No. 632,188—Dec. 5, 1961, in the amounts given in that patent, especially a polyethylene oxide of a molecular weight of about 500 to about 20,000.

The image-yielding processes useful with the elements of this invention comprise:

(1) Exposing with actinic light, imagewise, a photopolymerizable element comprising a support bearing a photopolymerizable solid stratum comprising (a) At least one ethylenically unsaturated compound containing at least one terminal ethylenic group, having a boiling point above 100° C. at normal pressure and (b) A sublimable dye, e.g., a dye that sublimes at a temperature between 50° C. and 300° C. and below the temperature at which said layer becomes tacky and adherent to paper sufficient to give the desired density, usually in an amount of at least 0.001 part by weight;

(2) Pressing the surface of the exposed stratum into contact with the image-receptive surface of a separate element;

(3) Heating at least one of the contacting elements to a temperature at which the dye sublimes but below that at which the layer becomes tacky and adherent to a receptive surface; and (4) Separating the surfaces of the two elements whereby a dye image is formed in the image-receptive surface.

The imagewise exposure of the photopolymerizable element to actinic light is continued until substantial addition polymerization takes place in the exposed areas.

The term "underexposed," as used herein, is intended to cover the image areas which are completely unexposed or partially exposed so that there is a material amount of the addition polymerizable compound still present and insufficient addition polymer image has been formed to impede the passage of the sublimable dye in the photopolymerizable layer.

In carrying out the process of the invention, there are two temperature conditions which should be taken into account. These temperatures are as follows:

$T_t$=A tack temperature of the surface of the underexposed (including unexposed) areas of the photopolymerizable element at which temperature said surface becomes tacky or softens or melts and becomes adherent to the surface of a receptor, e.g., a sheet of paper.

$T_0$=An operating temperature, i.e., dye sublimation and transfer temperature or range of temperature over which transfer of dye from the underexposed areas to a receptor takes place.

The elements of the invention can be provided (a) with a thin, protective stratum that is permeable to the sublimable dye or that melts at or below the tack temperature, (b) with a stratum of the type described in assignee's Burg U.S. application Ser. No. 234,214, filed Oct. 30, 1962, or with (c) a strippable cover sheet of the type described in Heiart U.S. Patent 3,060,026, Oct. 23, 1962.

In general, the photopolymerizable compositions are not thermally polymerizable within 0.5 second at temperatures below the softening or melting point of the composition.

In an embodiment of this invention, the polymeric component (c) can be replaced in whole or in part by filler materials which are immiscible with the ethylenically unsaturated component (a). Examples of such materials include organophilic silicas, bentonites, silica, powdered glass and baryta.

While the addition polymerizable component present in the underexposed areas of the photopolymerizable element can be a monomeric ethylenically unsaturated compound capable of polymerizing or forming a high polymer in a short time, e.g., 0.5–10 seconds, by photoinitiated polymerization as disclosed in Plambeck U.S. 2,760,863, the particularly useful compounds fall within a general class, namely, normally non-gaseous (i.e., at 20° C. and atmospheric pressure) ethylenically unsaturated monomeric compounds having at least one terminal ethylenic group and a normal boiling point above about 100° C. It is often desirable to attach the unsaturated groups to a preformed polymer which may then be used in place of components (a) and (c) or in combination with other components (a) and (c).

In practicing the invention, a photopolymerizable element containing an image-yielding stratum of the above components and the sublimable dye is exposed to actinic radiation through a photographic transparency, e.g., a photographic positive or negative, a light-transmitting paper, or to an image or printed matter on an opaque support by means of reflex exposure, and is brought in intimate contact with a receptor support, e.g., paper, metal, synthetic polymer, etc., during which time the element is heated in the range of 50 to 300° C. or more, and while still warm the surfaces are separated. The sublimable dye alone or together with some unsaturated monomer migrates to the receptor support in the areas corresponding to the unexposed or least exposed areas to give at least one duplicate copy of the original positive, negative or original image. Multiple copies can be obtained by repeating the heat transfer procedure using appropriate coating thicknesses of and appropriate concentration of dye in the photosensitive layer and temperatures to give the desired number of copies.

In an exemplary procedure, the foregoing layer on a flexible film support, e.g., a copolymer coated polyethylene terephthalate film base as described in Alles et al. U.S. 2,627,088, is exposed through a photographic transparency to actinic radiation whereby addition polymerization takes place in the exposed areas but not in the unexposed areas. A receptor support, preferably white paper, is brought in contact with the exposed and imagewise photopolymerized element. The sandwich formed is heated at a temperature of 50 to 300° C. for 0.1 to 20 seconds, preferably for about 1 to 10 seconds, and the element and receptor support then separated from each other. The dye sublimes and passes more rapidly through the unexposed than the exposed image areas to the receptor support. Multiple copies can be prepared using the above procedure and a new receptor support for each copy.

The invention will be further illustrated by the following examples:

*Example I*

A photopolymerizable composition was prepared by mixing 1 g. of a polyvinyl alcohol polymer (88% hydrolyzed) having a viscosity of 4 to 6 centipoises for a 4% by weight water solution at 20° C. determined by means of the Hoeppler "falling ball" method, 6 cc. of ethanol, 4 cc. of water, 1 g. of polyethylene glycol diacrylate (average molecular weight of diol precursor being 300) and 0.002 g. of phenanthrenequinone. To the photopolymerizable composition was added 0.001 g. of a violet dye, 1-anilino-4-hydroxyanthraquinone and the dye-containing composition was coated to a wet thickness of 7 mils on a 4-mil thick sheet of polyethylene terephthalate film bearing a subcoat of a copolymer of vinylidene chloride/methyl acrylate/itaconic acid as disclosed in Alles et al. U.S. Patent 2,627,088. The coating was dried and a 2.5-mill thick photopolymerizable layer remained on the film. This layer was exposed in a vacuum frame through a positive transparency to 1.75 watts of actinic radiation per square inch for 5 seconds by means of an 1800-watt high pressure mercury-arc light at a distance of 1 inch from the photopolymerizable surface. The photopolymerized element was brought into intimate contact with a sheet of white paper, and the sandwich formed was heated through the film base for 3 seconds by means of a flat, metal surface preheated to 140° C. The photopolymerized element was separated from the paper and a violet-colored reproduction of the original photographic transparency was formed on the paper. The heating and transfer operations were repeated three times using a new paper support each time. Three additional copies of satisfactory quality were obtained. The temperature of 140° C., although high enough for rapid sublimation of the dye, was considerably below the tack temperature ($T_t$) of the photopolymerizable stratum. There was no indication of a relief image appearing in the photopolymerized stratum, even after making the three additional copies. There was, however, an imagewise reduction in optical density resulting from the removal of dye from the photopolymerized stratum. Apparently there was no massive transfer of the material from this stratum (i.e., no appreciable transfer of the polymeric binder).

*Example II*

Similar results were obtained by substituting for the 1-anilino-4-hydroxyanthraquinone of the foregoing example, 3'-hydroxyquinophthalone (see U.S. 2,006,022 Examples I and II), "Latyl" Yellow RCY (the monoazo dye obtained by diazotizing 4-amino-3-nitrotoluene and coupling to 3-methylpyrazolone) and the oil-soluble dye of the following formula:

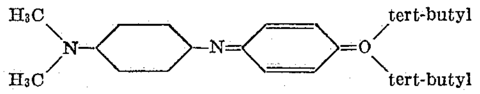

*Example III*

A photopolymerizable composition was prepared by mixing 1.0 g. of a cellulose acetate polymer containing 52.0 to 52.8% combined acetic acid, having a viscosity of 30 to 50 seconds as determined by ASTM procedure D–871–48, Formula A, dissolved in 11 g. of acetone, 1.56 g. of polyethylene glycol diacrylate (average molecular weight of diol precursor 300), and 0.0016 g. of anthroquinone. To the photopolymerizable solution was added 0.003 g. of a violet dye, 1-anilino-4-hydroxyanthraquinone. The photopolymerizable solution containing the dye was coated on a 1.5-mil thick polyethylene terephthalate film and dried in absence of actinic radiation. The dry coating was 0.3-mil thick. The surface of said coating was brought in contact, in a vacuum frame, with a photographic positive transparency containing line and letter text images, and the photopolymerizable layer was exposed through the transparency to 1.75 watts of actinic radiation per square inch for 1 second by means of a 1,800-watt high-pressure mercury arc light placed one inch from the photopolymerizable surface. After removing the exposed element from the vacuum frame, the element was separated from the photographic transparency and brought in intimate contact with a sheet of white paper. The sandwich formed was heated through the film support by bringing a flat metal surface preheated to 150° C. into contact with the film support for 10 seconds. Upon separation of the two sheets, a violet colored copy of the original image remained on the paper sheet as a result of sublimation and transfer from the unexposed (unpolymerized) areas to the paper. The above described procedure was repeated except that the dye obtained by coupling diazotized 4-amino-3-nitrotoluene with 3-methylpyrazolone was added to the photopolymerizable solution. Comparable results were obtained as with violet dye.

*Example IV*

A photopolymerizable composition was prepared by mixing 1 g. of N-methoxymethylpolyhexamethylene adipamide having an intrinsic viscosity of about 1, having methoxymethyl groups on 45% of the amido nitrogen atoms, and having a softening temperature of 135 to 140° C., 5 cc. of ethanol, 1.5 g. of tetramethylene dimethacrylate, 0.015 g. of benzoin methyl ether and 0.05 g. of the violet dye described in Example I. The photopolymerizable composition was coated to a wet thickness of 11 mils on 4 mil polyethylene terephthalate film subcoated as described in Example I. The photopolymerizable coating dried to a thickness of 1.9 mils and was then exposed as described in Example I to 1.75 watts of actinic radiation per square inch for 4 seconds using the light source described in that example. A sheet of white paper was brought into intimate contact with the photopolymerized layer and the sandwich was heated through the film base for 3 seconds by means of a metal surface preheated at 130° C. The heating and transfer operations were repeated four times using a new paper support for each transfer. Four satisfactory duplicate copies of the original transparency were obtained.

Most dyes have very low vapor pressures at moderate temperatures and would thus not be useful in accordance with this invention. However, any sublimable dye which has an appreciable vapor pressure between 50 and 300° C. is useful in this invention.

Dyes useful in accordance with this invention are those which show appreciable vapor pressure at the operating temperature so that a sufficient quantity will sublime or pass into the gaseous state, transfer to a receptor and thereby render a visible image. The greater the tinctorial strength of the dye, the lower the sublimability required for transfer of sufficient material for a visible image. Dyes whose sublimability is such that from 5 to 100% will transfer at this operating temperature are preferred, in order to minimize the amount of dye required in the photopolymerizable layer. For a discussion of the phenomenon of sublimation, see Glasstone's Textbook of Physical Chemistry, 2nd edition, D. van Nostrand Co. (1946), page 465, and following.

Suitable addition polymerizable ethylenically unsaturated compounds which can be used in this invention include unsaturated esters of polyols, particularly such esters of the alpha-methylene carboxylic acids, e.g., ethylene diacrylate, diethylene glycol diacrylate, glycerol diacrylate, glycerol triacrylate, mannitol polyacrylate, sorbitol polyacrylates, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol di-, tri- and tetra-methacrylate, pentaerythritol di-, tri- and tetra-acrylate, dipentaerythritol polyacrylate, 1,3-propanediol diacrylate, 1,5-pentanediol dimethacrylate, the bis-acrylates and methacrylates of polyethylene glycols of molecular weight 200–4000, and the like; unsaturated amides, particularly those of the alpha-methylene carboxylic acids, and especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis($\gamma$-methacrylamidopropoxy)ethane, $\beta$-methacrylamidoethyl methacrylate, N-($\beta$-hydroxyethyl)-$\beta$-(methacrylamido)ethyl acrylate and N,N-bis($\beta$-methacrylyloxyethyl) acrylamide; vinyl esters such as divinyl succinate, divinyl adipate, divinyl phthalate, divinyl terephthalate, divinyl benzene-1,3-disulfonate, and divinyl butane-1,4-disulfonate; and unsaturated aldehydes, such as sorbaldehyde(hexadienal). An outstanding class of these preferred addition polymerizable components are the esters and amides of $\alpha$-methylene carboxylic acids and substituted carboxylic acids with polyols and polyamines wherein the molecular chain between the hydroxyls and amino groups is solely carbon or oxygen-interrupted carbon. The preferred monomeric compounds have more than one ethylenically unsaturated group. The amount of monomer added varies with the particular polymer used. Preferably the viscosity of the monomeric compound decreases rapidly with increased temperature and the viscosity increases rapidly as the monomer polymerizes.

Polymeric components useful in the invention which are non-tacky at the sublimation temperature include: cellulose, cellulose esters, cellulose ethers, polyvinyl alcohol, polyvinyl alcohol-formaldehyde and -butyraldehyde acetals, methoxymethyl polyhexamethylene adipamide, gelatin, polyurethane, natural and synthetic rubbers, etc.

The monomer and polymer functions can be combined in a single material which is then a polymerizable binder. Suitable such materials include compounds in which the ethylenic unsaturation is present as an extralinear substituent attached to a linear polymer, such as cellulose acetate acrylate, cellulose acetate methacrylate, polyvinyl acetate acrylate, polyvinyl acetate methacrylate, N-acrylyloxymethylpolyamide, N-methacrylyloxymethylpolyamides, allyloxymethylpolyamide, etc. These compounds are used in conjunction with a suitable, inert, plasticizer, e.g., glycerol, ethylene glycol, polyethylene glycol.

A preferred class of addition polymerization initiators activatable by actinic light and thermally inactive at and below 185° C. are the substituted or unsubstituted polynuclear quinones, which compounds have two intracyclic carbonyl groups attached to intracyclic carbon atoms in a conjugated six membered carbocyclic ring, there being at least one aromatic carbocyclic ring fused to the ring containing the carbonyl groups. Suitable such initiators include 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8,9,10-tetrahydronaphthacenequinone, and 1,2,3,4-tetrahydrobenz[a]anthracene-7,12-dione. Other photo-initiators which are also useful include vicinal ketaldonyl compounds such as diacetyl, benzil, etc.; $\alpha$-ketaldonyl alcohols, such as benzoin, pivaloin, etc.; acyloin ethers, such as benzoin methyl or ethyl ethers, etc.; $\alpha$-hydrocarbon substituted aromatic acyloins, including $\beta$-methylbenzoin, $\alpha$-allylbenzoin, and $\alpha$-phenylbenzoin.

Suitable thermal polymerization inhibitors that can be used in addition to the preferred p-methoxyphenol include hydroquinone, and alkyl and aryl-substituted hydroquinones, tert-butyl catechol, pyrogallol, copper resinate, naphthylamines, beta-naphthol, cuprous chloride, 2,6-di-tert-butyl-p-cresol, phenothiazine, pyridine, nitrobenzene and dinitrobenzene. Other useful inhibitors include p-toluquinone and chloranil.

The sublimable dyes used in accordance with this invention should have a relatively low optical density for the radiation used to expose and photopolymerize the monomeric compound.

The photopolymerizable composition is preferably coated on a base support. Support materials should be stable at the heating temperatures used in the instant invention. Suitable bases or supports include those disclosed in Plambeck U.S. Patent 2,760,863, col. 5, lines 14 to 33, glass, wood, paper, cloth; cellulose esters, e.g., cellulose acetate, cellulose propionate, cellulose butyrate; polyolefins, e.g., polyethylene, polypropylene, etc. The support may have in or on its surface and beneath the photopolymerizable stratum an antihalation layer as is disclosed in said Plambeck patent.

The photopolymerizable layer is exposed to actinic radiation, generally through a photographic transparency, e.g., a negative or positive. Process transparencies, i.e., image-bearing transparencies consisting solely of substantially opaque and substantially transparent areas where the opaque areas are substantially of the same optical density, the so-called line or halftone negative or positive, are preferred, but continuous tone transparencies can also be used to produce tone gradation through variations in diffusion of the dye. It is possible to expose through paper or other light transmitting materials. A stronger light source or longer exposure times must be used, however. Reflex exposure can also be used, e.g., in copying from opaque originals, e.g., paper, cardboard, metal, etc., as well as from poor light-transmitting surfaces with no loss in speed, excellent resolution, and in addition, right-reading copies are obtained directly on transfer.

Good copies having high contrast and low stain are obtained using reflex techniques by adding small amounts of contrast-increasing sensitometric modifiers. Suitable compounds are disclosed in assignee's Heiart patent application Serial No. 186,221, and Burg patent application No. 186,222, both filed April 9, 1962.

Since the preferred free-radical generating addition-polymerization initiators activatable by actinic radiation, e.g., 9,10-phenanthrenequinone, exhibit at least part of their sensitivity in the visible range, the radiation source should furnish an effective amount of this radiation. Such sources include carbon arcs, mercury-vapor arcs, fluorescent lamps, argon glow lamps, electronic flash units and photographic flood lamps. Of these, the mercury-vapor arcs, particularly the sunlamp type, and the fluorescent lamps, are most suitable. The sunlamp mercury-vapor arcs are customarily used at a distance of one and one-half to 20 inches from the photopolymerizable layer. Other initiators may require higher amounts of ultraviolet radiation to be effective. In such cases, the radiation source should furnish an effective amount of ultraviolet radiation. Many of the radiation sources listed above furnish the required amount of this radiation.

After the exposure of the photopolymerizable layer and removal of the cover sheet, where present, the exposed composition is brought into intimate contact with a separate receptor support. Suitable supports include paper, e.g., bond paper, resin and clay sized paper, resin coated or impregnated paper; cardboard; metal sheets and foils, e.g., aluminum, copper, steel, bronze, etc.; wood; glass; nylon; rubber; polyethylene; linear condensation polymers such as the polyesters, e.g., polyethylene terephthalate; regenerated cellulose; cellulose esters, e.g., cellulose acetate; silk; cotton; and viscose rayon fabrics. It is important that the receptor support be stable at the operating temperatures. The particular support used is dependent on the desired use for the transferred image and on the receptivity of the base for the image.

The sandwich formed by bringing the exposed photopolymerized surface and the receptor support in intimate contact is heated to effect the sublimation of the dye in the areas corresponding to the underexposed, unpolymerized areas of the photopolymerizable composition. Heat is preferably applied simultaneously with the contact of the exposed element to the receptor support. It can be applied, however at any stage of the process prior to the separation step to either or both elements provided the operating temperatures are sufficient to cause the dye to sublime or transfer from the photopolymerizable composition. Heat can be applied by means well known to the art, e.g., rollers, flat or curved heating surfaces or platens, radiant sources, e.g., heating lamps, etc. The heating temperatures and contact periods vary with the different types of photopolymerizable compositions used. The temperature generally ranges from 50 to 300° C. and the contact time from 0.1 to 20 seconds.

This invention is useful for a variety of copying, printing, decorative and manufacturing applications. Multicopies of the images can be obtained. Reflex exposure can be used for any of these applications provided the base support is transparent, and is especially useful in copying from poorly or non-light-transmitting supports, e.g., paper, cardboard, etc.

The elements of this invention have the advantage that they can be used in a simple, inexpensive procedure, involving the use of light and heat in a dry system, by which copies of images which are of high quality and stability are obtained rapidly. Additional advantages will be apparent from the above description to those skilled in the art.

I claim:

1. A photopolymerizable element comprising a support bearing a continuous solid layer comprising a uniform mixture of:

(a) at least one ethylenically unsaturated compound containing at least one terminal ethylenic group, having a boiling point above 100° C. at atmospheric pressure and being capable of forming an insoluble polymer by photo-initiated addition polymerization by means of actinic radiation, and (b) a sublimable dye that has a relatively low optical density to said radiation and sublimes at atmospheric pressure at a temperature between 50° C. and 300° C. and below the temperature at which said layer becomes tacky and adherent to paper.

2. An element according to claim 1 wherein the support is a hydrophobic film.

3. An element according to claim 1 wherein said sup- is flexible and transparent.

4. An element according to claim 1 wherein said sup- is a polypropylene film.

5. An element according to claim 1 wherein said dye is 1-anilino-4-hydroxyanthraquinone.

6. An element according to claim 1 wherein said dye is 3'-hydroxyquinophthalone.

7. A photopolymerizable element comprising a support bearing a continuous solid layer comprising a uniform mixture of:

(a) at least one ethylenically unsaturated compound containing at least one terminal ethylenic group, having a boiling point above 100° C. at atmospheric pressure and being capable of forming an insoluble polymer by photoinitiated addition polymerization by means of actinic radiation, (b) a sublimable dye that has a relatively low optical density to said radiation and sublimes at atmospheric pressure at a temperature between 50° C. and 300° C. and below the temperature at which said layer becomes tacky and adherent to paper, and (c) at least one solid viscosity-modifying agent which does not became tacky and adherent to paper at a temperature below the sublimation temperature of the colorant, components (a) and (c) being present in amounts from 3 to 97 and 97 to 3 parts, by weight.

8. An element according to claim 1 wherein said element also contains (d) an addition polymerization initiator activatable by actinic light and thermally inactive below 185° C., in an amount from 0.001 to 10 parts, by weight.

9. An element according to claim 1 wherein said element also contains (d) an addition polymerization initator activatable by actinic light and thermally inactive below 185° C., in an amount from 0.001 to 10 parts, by weight, (e) an addition polymerization inhibitor in an amount from 0.001 to 2.0 parts, by weight, and (f) at least one chain transfer agent.

10. An element according to claim 1 wherein said element also contains (d) an addition polymerization initiator activatable by actinic light and thermally inactive below 185° C., in an amount from 0.001 to 10 parts, by weight, said sublimable dye being characterized in that it absorbs actinic radiation in a region of the visible spectrum but does not absorb appreciable actinic radiation in another region where said initiator is activatable.

11. An element according to claim 1 having a strippable protective cover sheet on said solid layer.

12. An element according to claim 1 having a protective layer on said solid layer, the protective layer having a high tack temperature.

References Cited by the Examiner

UNITED STATES PATENTS

| | | | |
|---|---|---|---|
| 1,913,881 | 6/1933 | Heinecke | 117—1.7 |
| 2,503,759 | 4/1950 | Murray | 117—37 |
| 3,060,025 | 10/1962 | Burg et al. | 96—115 |
| 3,060,026 | 10/1962 | Heiart | 96—115 |
| 3,097,096 | 7/1963 | Oster | 96—115 |
| 3,121,650 | 2/1964 | Meissner | 250—65.1 |

FOREIGN PATENTS

| | | |
|---|---|---|
| 137,036 | 7/1963 | Russia. |

NORMAN G. TORCHIN, *Primary Examiner.*